United States Patent
Le et al.

(10) Patent No.: US 12,182,672 B2
(45) Date of Patent: Dec. 31, 2024

(54) SYSTEMS AND METHODS FOR GENERATING DYNAMIC CONVERSATIONAL QUERIES IN USER INTERFACES USING STATE MACHINE LIBRARIES

(71) Applicant: Capital One Services, LLC, McLean, VA (US)

(72) Inventors: Minh Le, McLean, VA (US); William Miller, McLean, VA (US); Sara Mikulic, McLean, VA (US); Rui Zhang, McLean, VA (US); Erik Mueller, McLean, VA (US)

(73) Assignee: Capital One Services, LLC, McLean, VA (US)

( * ) Notice: Subject to any disclaimer, the term of this patent is extended or adjusted under 35 U.S.C. 154(b) by 912 days.

(21) Appl. No.: 17/307,590

(22) Filed: May 4, 2021

(65) Prior Publication Data
US 2022/0358396 A1    Nov. 10, 2022

(51) Int. Cl.
*G06N 20/00*    (2019.01)
*G06F 16/335*    (2019.01)
*G06F 16/338*    (2019.01)
*G06F 40/30*    (2020.01)

(52) U.S. Cl.
CPC .......... *G06N 20/00* (2019.01); *G06F 16/335* (2019.01); *G06F 16/338* (2019.01); *G06F 40/30* (2020.01)

(58) Field of Classification Search
CPC ........ G06N 20/00; G06N 3/09; G06F 16/335; G06F 16/338; G06F 40/30; G06F 40/35
See application file for complete search history.

(56) References Cited

U.S. PATENT DOCUMENTS 11,184,306 B1* 11/2021 Angeli .............. G06Q 10/1095
2016/0294952 A1* 10/2016 Bodell ................. H04L 51/046

* cited by examiner

*Primary Examiner* — Hope C Sheffield
(74) *Attorney, Agent, or Firm* — Foley & Lardner LLP

(57) ABSTRACT

Described are methods and systems are for generating dynamic conversational queries. For example, as opposed to being a simply reactive system, the methods and systems herein provide means for actively determining a user's intent and generating a dynamic query based on the determined user intent. Moreover, these methods and systems generate these queries in a conversational environment.

20 Claims, 5 Drawing Sheets

300

If *prediction_confidence[] > resolution_threshold[]*:

Precondition_checking: *Check for action validity using available data.*

Value of *resolution_type[]*:

Message: *Output guidance message*

Auto Resolve: *Call API to get and check if conditions are met. If yes, then resolve the need e.g. 'Waive Fee' with customers' confirmation.*

Interaction Resolve: *Call action_agent[] to interact with customers to identify parameters specific to this intent e.g. account number, amount for 'Transaction_BalanceTransfer'.*

FIG. 3

SYSTEMS AND METHODS FOR GENERATING DYNAMIC CONVERSATIONAL QUERIES IN USER INTERFACES USING STATE MACHINE LIBRARIES

BACKGROUND

In recent years, the amount and uses of interactive programs has risen considerably. These interactive programs may generate and respond to user interactions in a user interface in order to engage in a conversational interaction with the user. The conversational interaction may include a back-and-forth exchange of ideas and information between the interactive program and the user.

SUMMARY

Methods and systems are described herein for generating dynamic conversational queries. For example, as opposed to being a simply reactive system, the methods and systems described herein provide means for actively determining a user's intent and generating a dynamic query based on the determined user intent. Moreover, the methods and systems generate these queries in a conversational environment. For example, conversational responses and/or queries include communications between a user and a system that may maintain a conversational tone, cadence, or speech pattern of a human during an interactive exchange between the user and the system. The interactive exchange may include the system generating queries to the user, responding to one or more user actions (which may include user inactions), and/or predicting responses prior to receiving a user action. In order to maintain the conversational interaction during the exchange, the system may advantageously generate responses that are both timely and pertinent (e.g., in a dynamic fashion). This requires the system to determine both quickly (i.e., in real-time or near real-time) and accurately the intent, goal, or motivation prior to receiving a user input (e.g., based on available user data). These user inputs or user data may take various forms including speech commands, textual inputs, responses to system queries, and/or other user actions (e.g., logging into a mobile application of the system). In each case, the system may aggregate information about a previous user action, information about the user, and/or other circumstances related to the user action (e.g., time of day, previous user actions, current account settings, etc.) in order to determine a likely intent of the user.

In order to determine the likely intent and generate a dynamic conversational response that is both timely and pertinent, the methods and systems herein use one or more state machines from a state library. For example, aggregated information about the user action, information about the user, and/or other circumstances related to the user action (e.g., time of day, previous user actions, current account settings, etc.) may be used to generate a feature input (e.g., a vector of data) that expresses the information quantitatively or qualitatively. However, feature inputs for similar intents (e.g., a first intent of a user to learn about a first set of information and a second intent of a user to learn about a second set of information) may have similar feature inputs as much of the underlying aggregated information may be the same. Moreover, training data for a machine learning model (e.g., known intents and labeled feature inputs) may be sparse. Accordingly, determining a specific intent of a user, with a high level of precision is difficult, even when using a machine learning model.

To overcome these technical challenges, the methods and systems disclosed herein select specific state machine models for generating dynamic conversational queries. For example, the methods and systems use an architecture that anticipates or predicts a user's problem and automatically provides a solution. As such, a user no longer is required to answer initial questions and/or enter initial responses. To provide this, the system first determines various types of information such as prediction confidences and compares them to specific thresholds to determine an intent and/or resolution required by the user. The system may then determine a resolution type and use an algorithm to select a state machine from a state machine library for determining a resolution. The system may then generate a query based on the resolution. Thus, preventing the user from having enter or pose a question to the system.

In some aspects, methods and systems are disclosed for generating dynamic conversational queries in user interfaces using state machine libraries. For example, the system may receive user data. The system may determine, based on the user data, a first prediction confidence that a user requires a first resolution of a plurality of available resolutions. The system may compare the first prediction confidence to a first threshold confidence. The system may, in response to the first prediction confidence equaling or exceeding the first threshold confidence, select a first state machine from a plurality of state machines corresponding to a first resolution type of the first resolution. The system may determine, using the first state machine, a first parameter for the first resolution. The system may determine, based on the user data, whether the first parameter is met. The system may, in response to the first parameter being met, generate for display, on a user interface, a first dynamic conversational query corresponding to the first resolution.

Various other aspects, features, and advantages of the invention will be apparent through the detailed description of the invention and the drawings attached hereto. It is also to be understood that both the foregoing general description and the following detailed description are examples, and not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification "a portion," refers to a part of, or the entirety of (i.e., the entire portion), a given item (e.g., data) unless the context clearly dictates otherwise.

BRIEF DESCRIPTION OF THE DRAWINGS

FIG. 3 is an illustrative pseudocode for presenting dynamic conversational queries, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art, that the embodiments of the invention may be practiced without these specific details or with an equivalent arrangement. In other cases, well-known structures and devices are shown in block diagram form in order to avoid unnecessarily obscuring the embodiments of the invention.

Figure 1:
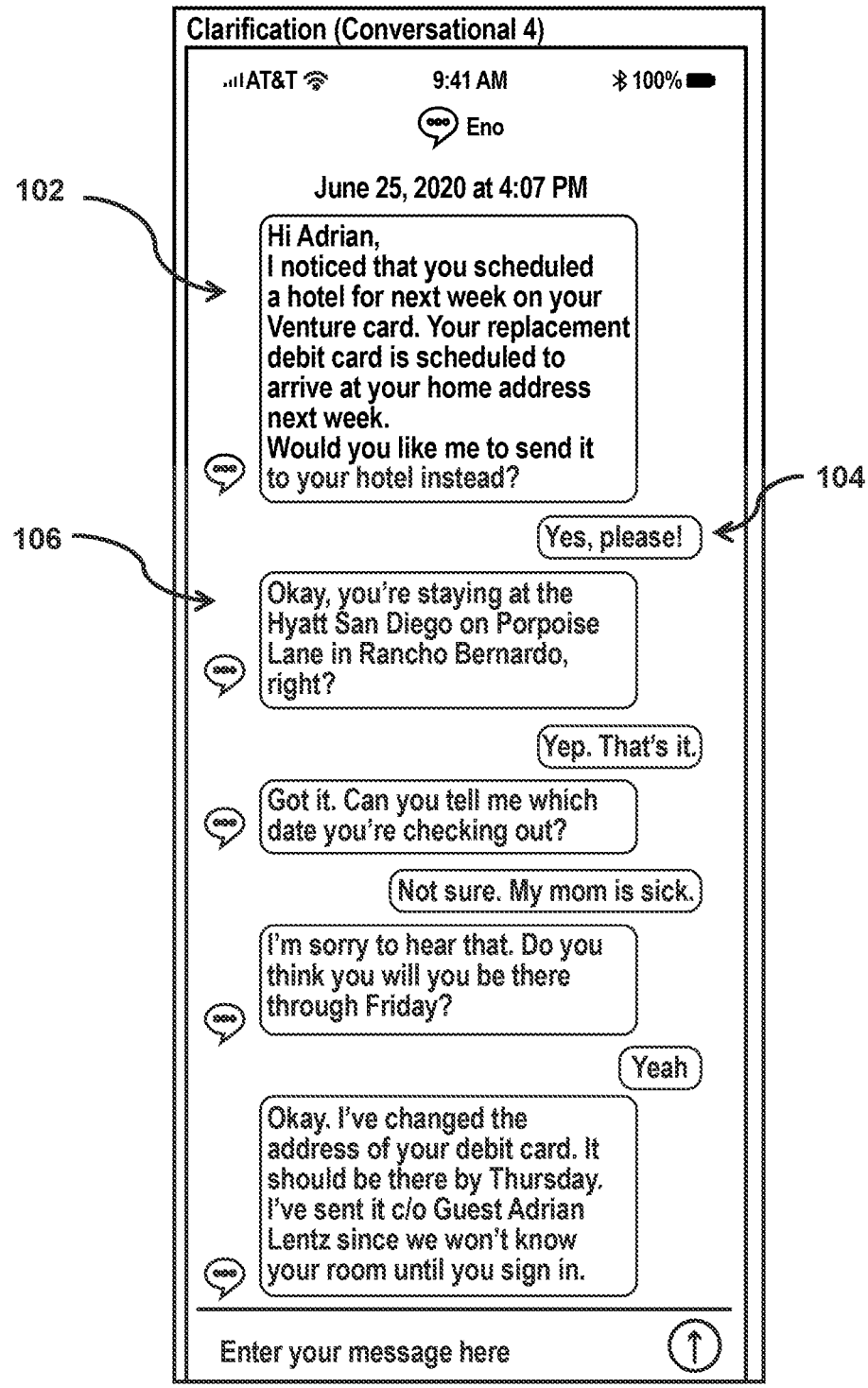
FIG. 1 shows an illustrative user interface for presenting dynamic conversational queries and responses, in accordance with one or more embodiments.

FIG. 1 shows an illustrative user interface for presenting dynamic conversational queries and responses, in accordance with one or more embodiments. For example, FIG. 1 shows user interface 100. The system (e.g., a mobile application) may generate and respond to user interactions in a user interface (e.g., user interface 100) in order to engage in a conversational interaction with the user. The conversational interaction may include a back-and-forth exchange of ideas and information between the system and the user. The conversational interaction may proceed through one or more mediums (e.g., text, video, audio, etc.). The system may provide human-like interactions and/or create applications that mimic the tone, cadence, and speech patterns of humans. In order to fulfill user-interaction requirements, the system needs to be helpful and respond intelligently by providing relevant responses to user inputs, whether these inputs are received via text, audio, or video input. For example, the system may use one or more artificial intelligence models and/or state machines (including machine learning models, neural networks, etc.) referred to here collectively as "models."

In order to maintain the conversational interaction, the system may need to generate responses (e.g., conversational response) dynamically and/or in substantially real-time. For example, the system may generate responses within the normal cadence of a conversation. In some embodiments, the system may continually determine a likely intent of the user in order to generate responses (e.g., in the form of prompts, notifications, and/or other communications) to the user. It should be noted that a response may include any step or action (or inaction) taken by the system, including computer processes, which may or may not be perceivable to a user.

For example, in response to a user action, which in some embodiments may comprise a user logging onto an application that generates user interface 100. In response to a user logging on, the system may generate a query (e.g., query 102). In response to a user inputting a query (e.g., query 104) into user interface 100, the system may then generate a subsequent query (e.g., query 106). The system may continue to receive queries (and responses thereto) as well as generate responses and/or queries.

In order to maintain the dynamic nature of the queries and/or responses the system may use one or more models. These models may execute a series of steps that may generate content quickly and accurately to maintain a cadence of a normal conversation with a user. These steps may include retrieving data about the user, retrieving data from other sources, monitoring user actions, and/or other steps in order to generate a feature input (e.g., as discussed below). In some embodiments, the system may generate a plurality of responses.

In some embodiments, the feature input may include a vector of values that describes various data about a user, a user action, and/or a current or previous interaction with the user. For example, a feature is an individual measurable property or characteristic of a user, a user action, and/or a current or previous interaction with the user. For example, the feature input may comprise a column of data (e.g., an input set) that represents characteristics of user data which the system may use to select a conversation response. Alternatively or additionally, the system may include a feature input layer that receives the feature input and applies data normalization. The system may further select the information for inclusion in the feature input based on a predictive value. The information may be collected actively or passively by the system and compiled into a user profile.

In some embodiments, the user data (e.g., a user action) may include conversation details, such as information about a current session, including a channel or platform, e.g. desktop web, iOS, mobile, a launch page (e.g., the webpage that the application was launched from), a time of launch, activities in a current or previous session before launching the application. The system may store this information, and all the data about a conversational interaction may be available in real-time via HTTP messages and/or through data streaming from one or more sources (e.g., via an API.).

In some embodiments, the user data (e.g., a user action) may include user account information such as types of accounts the user has, other accounts on file, such as bank accounts for payment, information associated with accounts, such as credit limit, current balance, due date, recent payments, or recent transactions. The system may obtain this data in real-time for model prediction through enterprise APIs.

In some embodiments, the user data (e.g., a user action) may include insights about users, provided to the application (e.g., via an API) from one or more sources, such as a qualitative or quantitative representations (e.g., a percent) of a given activity (e.g., online spending) in a given time period (e.g., six months), upcoming actions (e.g., travel departure, pay day, leave and/or family event) for a user, information about third parties (e.g., merchants (ranked by the number of transactions) over the last year for the user), etc.

For example, as shown in FIG. 1, a user may have requested a replacement card. The system may however have retrieved user data (e.g., travel information based on airline transaction records) that indicates that the user will not be at a home location when the replacement card arrives. As such, the system queries the user as to whether or not the user would like to divert the card to the user's present location. In response to the user responding in the affirmative, the system then determines whether a given parameter will be met (e.g., the user will still be at the location at the time of arrival).

Figure 2:
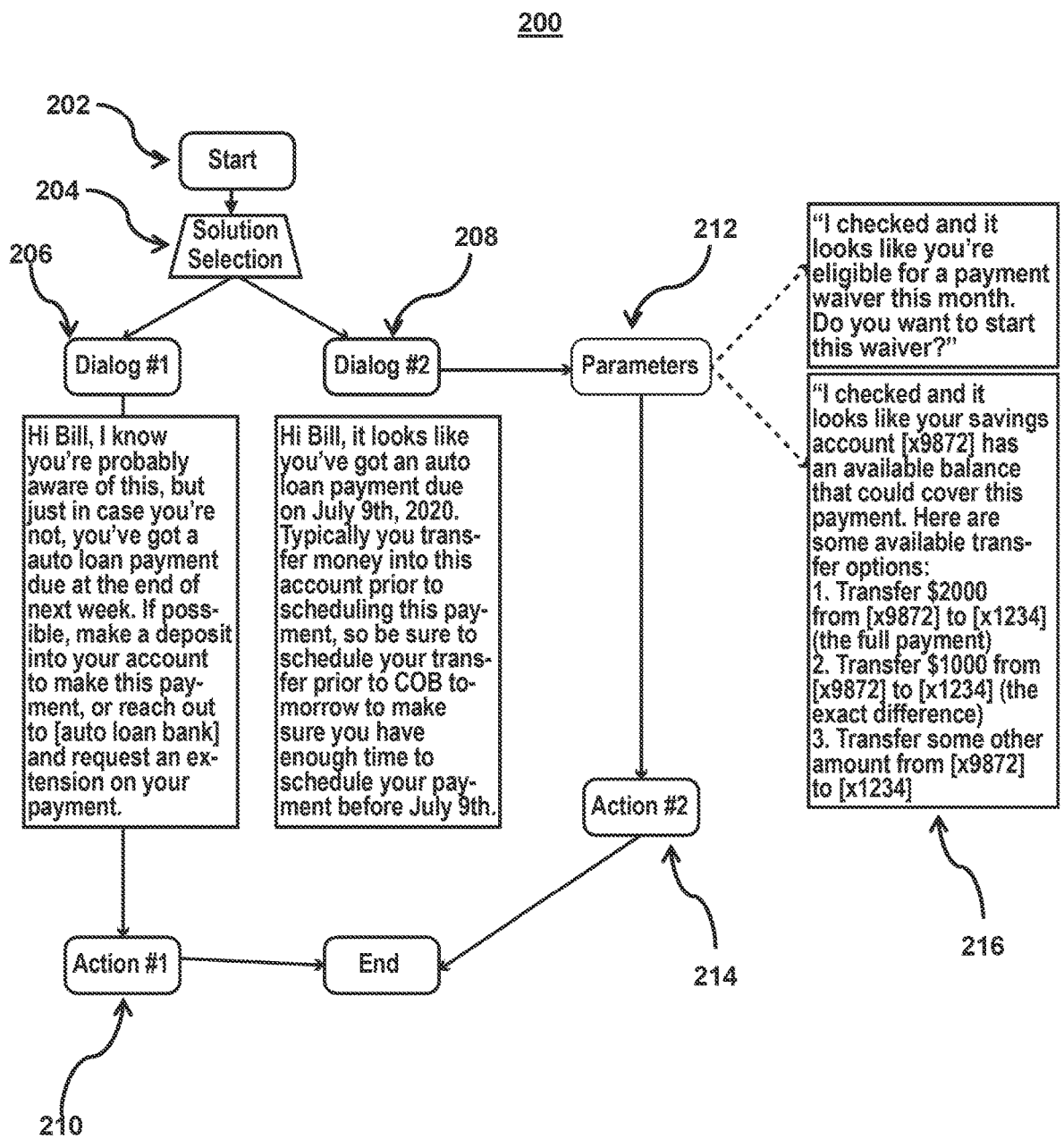
FIG. 2 shows an illustrative system workflow for selecting queries, in accordance with one or more embodiments.

FIG. 2 shows an illustrative system workflow for selecting queries, in accordance with one or more embodiments. For example, as shown in FIG. 2, workflow 200 may represent the steps taken by a system architecture used to select a state machine for generating dynamic conversational queries. Workflow 200 begins at step 202. At step 202, the system receives a request to generate a query. This request may come in response to a user logging into an application (e.g., an application generating user interface 100 (FIG. 1)). Additionally or alternatively, the request may be received in response to a user action (or inaction). For example, the system may determine a time to generate a query based on the time between user actions, which may be further based on a given person or population (e.g., a group of users).

Accordingly, the system may generate queries at different times, at different time intervals, and/or with different content depending on a given person or that person belonging to a given population. For example, the system may use time between actions to determine when conversational queries are shown. In such cases, a length of time between actions that is longer than the normal amount of time for a given user (e.g., based on a comparison with user history information in a user profile) may indicate that the user is unsure of what to do and/or ask. Accordingly, the user may automatically determine an intent of the user and generate a query based on that intent.

As step 204, the system may select a state machine for use in presenting dynamic conversational queries based on a predicted intent, goal, and/or objective of the user. As referred to herein, a "state machine" may a behavior model and/or other type of computer implemented architecture used to make determinations. For example, that state machine may consists of a finite number of states in a finite-state machine ("FSM") embodiment. Based on the current state and a given input the state machine may performs state transitions and produces outputs. A state is a situation of a system depending on previous inputs and causes a reaction on following inputs. One state is marked as the initial state; this is where the execution of the machine starts. A state transition defines for which input a state is changed from one to another. Depending on the state machine type, states and/or transitions produce outputs. State machine described herein may include Mealy and Moore state machines and/or Harel and UML statecharts. Moore machines consist of states and transitions. States are able to produce outputs, and the output is determined solely by the current state, not by any input. Mealy machines produce outputs only on transitions and not in states.

To select a state machine, the system may determine a confidence of a prediction (e.g., a prediction of the current intent of a user). Based on the confidence (and/or the determining intent, goal, and/or objective of the user), the system may select a state machine. For example, the system may store a plurality of state machines, each of which specializes in resolving particular issues (e.g., based on the intent, goal, and/or objective of the user). To select a state machine, the system may first predict an intent, goal, and/or objective of the user based on a confidence threshold for the prediction. For example, the system may, in response to the first prediction confidence equaling or exceeding a first threshold confidence, select a first state machine from a plurality of state machines corresponding to a first resolution type of the first resolution.

In some embodiments, the system may select a state machine based on one or more criteria. For example, the system may determine a characteristic of the first resolution type and compare the characteristic with listings of respective state machines that correspond to each resolution type of the plurality of available resolutions to determine that the first state machine corresponds to the first resolution type. For example, a given state machine may be used for selecting a resolution for users with a particular characteristic (e.g., demographic, language preference, account status, etc.).

Based on the prediction determined at step 204 (e.g., based on one or more models as described in FIG. 4), the system may present dialog option 206 or dialog option 208. For example, dialog option 206 may correspond to a first state machine, whereas dialog option 208 may correspond to a second state machine. Dialog option 206 and dialog option 208 may present queries (e.g., as described above in FIG. 1) that are presented on a user interface (e.g., user interface 100 (FIG. 1)).

Furthermore, in some embodiments, the state machine selected may run additional functions to determine one or more parameters. For example, workflow 200 may determine one or more parameters (e.g., parameters 212) for executing. Based on the presence of the parameters, whether or not a parameter is met, the state machine may generate additional dialog options (e.g., dialog options 216).

During operation of a state machine, the state machine may also response to an action (e.g., action 210 or action 214). These actions may be particular to the state machine and may be based on the parameters (if any) and/or whether or not a parameter is met. In some embodiments, an action may require receiving a user input. In a variety of embodiments, the action may perform additional functions (e.g., generate a notification, reschedule an appointment, etc.). For example, an action for activating an account card may have a precondition (e.g., expressed through a parameter) of whether an account card is activated. For example, each state may define events that trigger a transition. For example, the parameter may be whether or not the account card is activated. To perform the action (e.g., activate the card), the system may determine whether or not the parameter is met.

In another example, an action for paying a bill may have a precondition (e.g., expressed through a parameter) of whether an account balance is above the amount of the bill. For example, the parameter may be whether or not the account balance is above the amount of the bill. For example, each state may define events that trigger a transition. To perform the action (e.g., pay the bill), the system may determine whether or not the parameter is met. In another example, an action for cancelling a payment may have a precondition (e.g., expressed through a parameter) of whether payment is pending. For example, the parameter may be whether or not the payment is pending. To perform the action (e.g., cancel the payment), the system may determine whether or not the parameter is met. In some embodiments, if a parameter is not met, the system may institute a pre-design subroutine to generate dialog (e.g., for a dynamic conversational query) to receive user input and/or information to satisfy the parameter (e.g., as shown in FIG. 2).

FIG. 3 is an illustrative pseudocode for presenting dynamic conversational queries, in accordance with one or more embodiments. For example, pseudocode 300 may be used to execute a state machine to present dynamic conversational queries. It should be noted that the systems described herein may use different execution schemes. For example, in some embodiments, the system may use a cycle-based execution scheme. In a cycle-based execution scheme, the state machine may first collect events and later process them in a run-to-completion step. Run-to-completion steps are typically executed in regular time intervals. In the cycle-based execution scheme, each run cycle may consist of two different phases. First the system may collect incoming events and time events. Next, the system executes a runCycle( ) function and processes the events collected in the first phase. The system may use this approach in order to more efficiently process several events at the same time as well as for checking combinations of events.

In some embodiments, the system may use an event-driven execution scheme. In an event-driven execution scheme, the state machine becomes active each time an event arrives and processes it right away in a run-tocompletion step. In the event-driven execution scheme, each incoming event or time event immediately triggers the execution of a run-to-completion step. As a consequence, the state machine may not process two events simultaneously.

As described herein, the system may use a plurality of types of data to generate dynamic conversational queries. The system may use probabilistic programming. For example, probabilistic programming is a programming paradigm in which probabilistic models are specified and inference for these models is performed automatically. For example, the system may use a prediction confidence ("prediction_confidence"). The prediction confidence may be a confidence interval of a prediction that likely contains the mean value of the dependent variable given specific values of the independent variables. For example, a prediction confidence may be assigned to a potential intent, goal, and/or objective of a user. The system may determine the prediction confidence for each and compare the respective prediction confidence to a resolution confidence threshold ("resolution_threshold"). The resolution confidence threshold may be a threshold confidence required for the system to determine that a user as an intent corresponding to the prediction confidence. It should be noted at each intent may have a different confidence threshold. For example, the system may compare the first prediction confidence to a first threshold confidence. In some embodiments, the system may determine a threshold confidence based on one or more criteria. For example, the system may determine an accuracy metric for the first model and determine the first threshold confidence based on the accuracy metric. For example, if the system determines that the model used to determine the first prediction confidence is more accurate, the system may set a lower threshold confidence for selecting a state machine to generate a conversational query. In contrast, if the system determines that the model used to determine the first prediction confidence is less accurate, the system may set a higher threshold confidence for selecting a state machine to generate a conversational query.

In some embodiments, the threshold may be based on a resolution type ("resolution type"). For example, the resolution type may correspond to the type of action that is required to resolve the issue (e.g., address the intent, goal, and/or objective of the user). The resolution type may also be associated with any other characteristic of the resolution that is used to distinguish it from another resolution. Additionally or alternatively, the system may select resolution action agents (e.g., "action_agent"). For example, the resolution action agent may trigger an action (e.g., action 210 (FIG. 2) or action 214 (FIG. 2)). Furthermore, the resolution action agent may determine and/or execute an interaction (e.g., whether an automatic interaction or and action requiring user input). In some embodiments, the system may automatically resolve an issue through the use of a specialized application programming interface ("API") that cause one or more actions to occur.

The system may apply respective state machines to a plurality of scenarios. For example, in a first scenario, the system may pull user data that indicates an auto loan payment is due in a little over a week and user payment history (e.g., from a user profile) that the user typically pays this type of bill over a week beforehand. The system may also pull calendar information that indicates that banks are closed on part of Thursday and Friday (and Saturday and Sunday), so the user may run out of time to schedule my payment and get it in on time. The system may also pull user account data indicating the status of the account (e.g., whether there is enough money to pay the bill). Based on this data, the system may determine an alert needs to be sent (e.g., based on the user breaking from their normal payment habits) and the fact that the banks may be closed. If there is an available balance in the account to cover the bill, the system may provide a payment option. Alternatively, if no solutions exist (e.g., if no access to additional funds) the system may generate a query: "Hi Bill, I know you're probably aware of this, but just in case you're not, you've got an auto loan payment due at the end of next week. Consider reaching out to your bank and asking for an extension if you need a little more time to make your payment."

The system may then pull in connected accounts and past payment patterns and start attempting to find solutions to provide to the user. The solutions represent specific routine and parameter verifications of the state machine. For example, the system may determine that the auto loan payment is consistently associated with a transfer from an external account. Based on this information the system makes additional recommendations (e.g., "Consider transferring X by tomorrow to ensure you have enough time to make your payment."). For example, each state may define events that trigger a transition. This recommendation may itself have various parameters and requirements. For example, the system may query the user about transferring funds from an external account for the entire payment, making a partial payment, etc. The system may then generate an actual alert. For example, the system may determine that funds are available and provide an option to pay the amount. The option may be accompanied by dialog as shown in FIG. 1.

Figure 4:
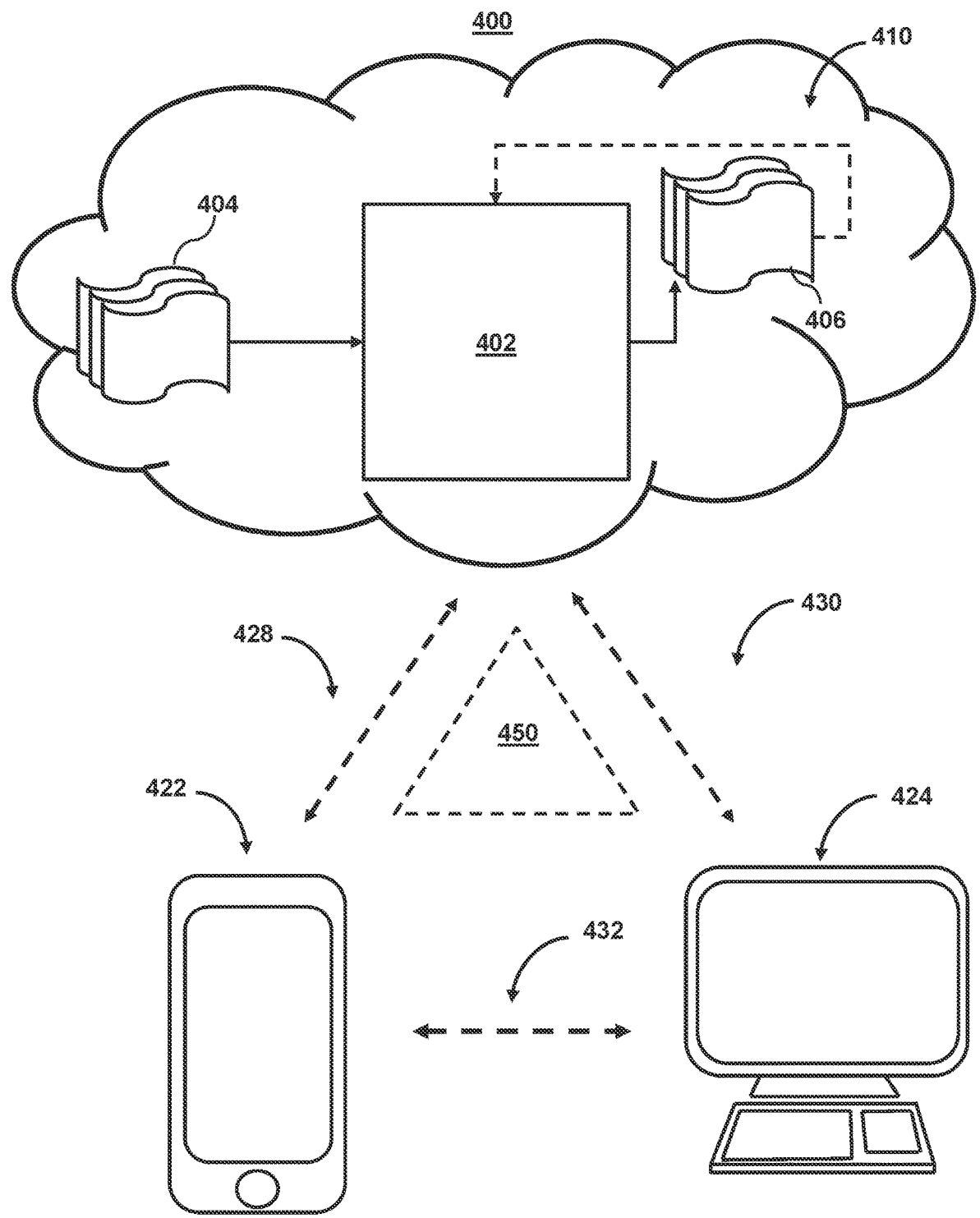
FIG. 4 is an illustrative system architecture for presenting dynamic conversational queries, in accordance with one or more embodiments.

FIG. 4 is an illustrative system architecture for presenting dynamic conversational queries, in accordance with one or more embodiments. For example, system 400 may represent the components used for generating dynamic conversational responses, as shown in FIG. 1. As shown in FIG. 4, system 400 may include mobile device 422 and user terminal 424. While shown as a smartphone and personal computer, respectively, in FIG. 4, it should be noted that mobile device 422 and user terminal 424 may be any computing device, including, but not limited to, a laptop computer, a tablet computer, a hand-held computer, other computer equipment (e.g., a server), including "smart," wireless, wearable, and/or mobile devices.

FIG. 4 also includes cloud components 410. Cloud components 410 may alternatively be any computing device as described above and may include any type of mobile terminal, fixed terminal, or other device. For example, cloud components 410 may be implemented as a cloud computing system and may feature one or more component devices. It should also be noted that system 400 is not limited to three devices. Users, may, for instance, utilize one or more devices to interact with one another, one or more servers, or other components of system 400. It should be noted, that, while one or more operations are described herein as being performed by particular components of system 400, those operations may, in some embodiments, be performed by other components of system 400. As an example, while one or more operations are described herein as being performed by components of mobile device 422, those operations, may, in some embodiments, be performed by components of cloud components 410. In some embodiments, the various computers and systems described herein may include one or more computing devices that are programmed to perform the described functions. Additionally, or alternatively, multiple users may interact with system 400 and/or one or more components of system 400. For example, in one embodiment, a first user and a second user may interact with system 400 using two different components.

With respect to the components of mobile device 422, user terminal 424, and cloud components 410, each of these devices may receive content and data via input/output (hereinafter "I/O") paths. Each of these devices may also include processors and/or control circuitry to send and receive commands, requests, and other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 4, both mobile device 422 and user terminal 424 include a display upon which to display data (e.g., conversational response, queries, and/or notifications).

Additionally, as mobile device 422 and user terminal 424 are shown as touchscreen smartphones, these displays also act as user input interfaces. It should be noted that in some embodiments, the devices may have neither user input interface nor displays and may instead receive and display content using another device (e.g., a dedicated display device such as a computer screen and/or a dedicated input device such as a remote control, mouse, voice input, etc.). Additionally, the devices in system 400 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 4 also includes communication paths 428, 430, and 432. Communication paths 428, 430, and 432 may include the Internet, a mobile phone network, a mobile voice or data network (e.g., a 5G or LTE network), a cable network, a public switched telephone network, or other types of communications networks or combinations of communications networks. Communication paths 428, 430, and 432 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices.

Cloud components 410 may be a database configured to store user data for a user. For example, the database may include user data that the system has collected about the user through prior interactions, both actively and passively. For example, the user data may describe one or more characteristics about a user, a user device, and/or one or more interactions of the user with a user device and/or application generating responses, queries, and/or notifications. Alternatively, or additionally, the system may act as a clearing house for multiple sources of information about the user. This information may be compiled into a user profile. Cloud components 410 may also include control circuitry configured to perform the various operations needed to generate alternative content. For example, the cloud components 410 may include cloud-based storage circuitry configured to generate alternative content. Cloud components 410 may also include cloud-based control circuitry configured to runs processes to determine alternative content. Cloud components 410 may also include cloud-based input/output circuitry configured to display alternative content.

Cloud components 410 may include model 402, which may be a machine learning model (e.g., as described in FIG. 4). Model 402 may take inputs 604 and provide outputs 406. The inputs may include multiple datasets such as a training dataset and a test dataset. Each of the plurality of datasets (e.g., inputs 404) may include data subsets related to user data, predicted intents, and/or actual intents. In some embodiments, outputs 406 may be fed back to model 402 as input to train model 402 (e.g., alone or in conjunction with user indications of the accuracy of outputs 406, labels associated with the inputs, or with other reference feedback information). For example, the system may receive a first labeled feature input, wherein the first labeled feature input is labeled with a known prediction for the first labeled feature input. The system may then train the first machine learning model to classify the first labeled feature input with the known prediction.

In some embodiments, model 402 may update its configurations (e.g., weights, biases, or other parameters) based on the assessment of its prediction (e.g., outputs 406) and reference feedback information (e.g., user indication of accuracy, reference labels, or other information). In some embodiments, where model 402 is a neural network, connection weights may be adjusted to reconcile differences between the neural network's prediction and reference feedback. In a further use case, one or more neurons (or nodes) of the neural network may require that their respective errors are sent backward through the neural network to facilitate the update process (e.g., backpropagation of error). Updates to the connection weights may, for example, be reflective of the magnitude of error propagated backward after a forward pass has been completed. In this way, for example, the model 402 may be trained to generate better predictions.

In some embodiments, model 402 may include an artificial neural network. In such embodiments, model 402 may include an input layer and one or more hidden layers. Each neural unit of model 402 may be connected with many other neural units of model 402. Such connections can be enforcing or inhibitory in their effect on the activation state of connected neural units. In some embodiments, each individual neural unit may have a summation function that combines the values of all of its inputs. In some embodiments, each connection (or the neural unit itself) may have a threshold function such that the signal must surpass it before it propagates to other neural units. Model 402 may be self-learning and trained, rather than explicitly programmed, and can perform significantly better in certain areas of problem solving, as compared to traditional computer programs. During training, an output layer of model 402 may correspond to a classification of model 402 and an input known to correspond to that classification may be input into an input layer of model 402 during training. During testing, an input without a known classification may be input into the input layer, and a determined classification may be output.

In some embodiments, model 402 may include multiple layers (e.g., where a signal path traverses from front layers to back layers). In some embodiments, back propagation techniques may be utilized by model 402 where forward stimulation is used to reset weights on the "front" neural units. In some embodiments, stimulation and inhibition for model 402 may be more free-flowing, with connections interacting in a more chaotic and complex fashion. During testing, an output layer of model 402 may indicate whether or not a given input corresponds to a classification of model 402 (e.g., a user intent).

In some embodiments, model 402 may predict alternative content. For example, the system may determine that particular characteristics are more likely to be indicative of a prediction. In some embodiments, the model (e.g., model 402) may automatically perform actions based on outputs 406. In some embodiments, the model (e.g., model 402) may not perform any actions on a user's account. The output of the model (e.g., model 402) is only used to decide which location and/or a delivery time offset to select.

System 400 also includes API layer 450. In some embodiments, API layer 450 may be implemented on mobile device 422 or user terminal 424. Alternatively or additionally, API layer 450 may reside on one or more of cloud components 410. API layer 450 (which may be A REST or Web services API layer) may provide a decoupled interface to data and/or functionality of one or more applications. API layer 450 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages including Ruby, Java, PHP, and JavaScript. SOAP Web services have traditionally been adopted in the enterprise for publishing internal services as well as for exchanging information with partners in B2B transactions.

API layer 450 may use various architectural arrangements. For example, system 400 may be partially based on API layer 450, such that there is strong adoption of SOAP and RESTful Web-services, using resources like Service Repository and Developer Portal but with low governance, standardization, and separation of concerns. Alternatively, system 400 may be fully based on API layer 450, such that separation of concerns between layers like API layer 450, services, and applications are in place.

In some embodiments, the system architecture may use a microservice approach. Such systems may use two types of layers: Front-End Layer and Back-End Layer where microservices reside, in this kind of architecture, the role of the API layer 450 may provide integration between Front-End and Back-End. In such cases, API layer 450 may use RESTful APIs (exposition to front-end or even communication between microservices). API layer 450 may use AMQP (e.g., Kafka, RabbitMQ, etc.). API layer 450 may use incipient usage of new communications protocols such as gRPC, Thrift, etc.

In some embodiments, the system architecture may use an open API approach. In such cases, API layer 450 may use commercial or open source API Platforms and their modules. API layer 450 may use developer portal. API layer 450 may use strong security constraints applying WAF and DDoS protection, and API layer 450 may use RESTful APIs as standard for external integration.

Figure 5:
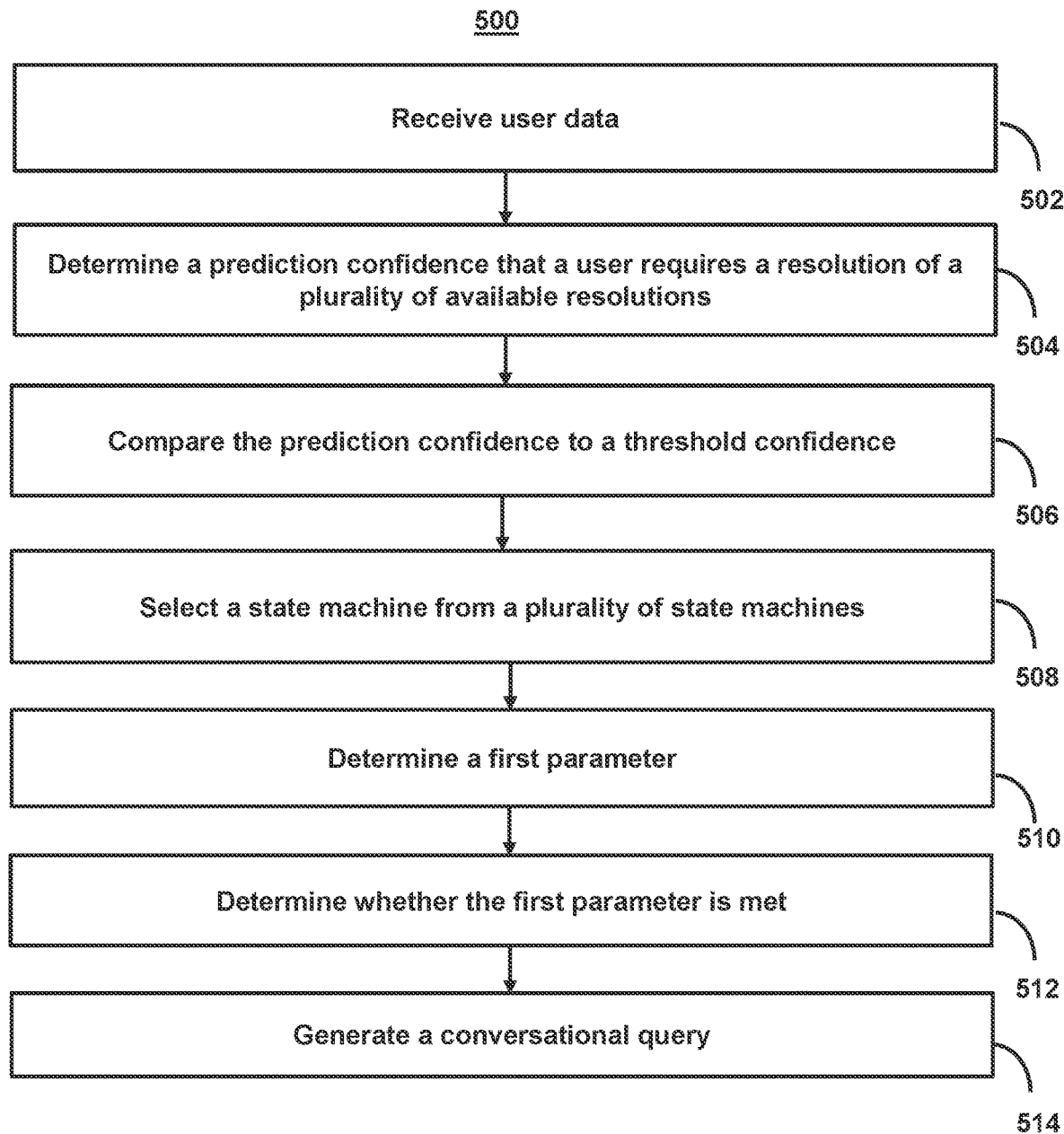
FIG. 5 shows a flowchart of the steps involved in user interface for presenting dynamic conversational queries, in accordance with one or more embodiments.

FIG. 5 shows a flowchart of the steps involved in user interface for presenting dynamic conversational queries, in accordance with one or more embodiments. For example, the system may use process 500 (e.g., as implemented on one or more system components) in order to generating dynamic conversational responses.

At step 502, process 500 (e.g., using one or more components described in system 400 (FIG. 4)) receives user data. For example, the system may receive user data in response to a user interacting with a user interface. The user data may describe one or more characteristics about a user, a user device, and/or one or more interactions of the user with a user device and/or application generating responses. In some embodiments, the system may use a generate a feature input (e.g., for input into a machine learning model). For example, the system may generate a feature input based on the user data, input the feature input into a first model, and receive an output from the first model, wherein the output comprises the first prediction confidence. For example, the feature input may comprise a column of data (e.g., an input set) that represents characteristics of user data upon which the system may use to select a conversation response. Alternatively or additionally, the system may include a feature input layer that receives the feature input and applies data normalization.

At step 504, process 500 (e.g., using one or more components described in system 400 (FIG. 4)) determines a prediction confidence that a user requires a resolution of a plurality of available resolutions. For example, the system may determine, based on the user data, a first prediction confidence that a user requires a first resolution of a plurality of available resolutions.

For example, the system may use probabilistic programming. For example, probabilistic programming is a programming paradigm in which probabilistic models are specified and inference for these models is performed automatically. The system may also utilize the distributions generated over our possible model outcomes to determine prediction confidences.

At step 506, process 500 (e.g., using one or more components described in system 400 (FIG. 4)) compares the prediction confidence to a threshold confidence. For example, the system may compare the first prediction confidence to a first threshold confidence. In some embodiments, the system may determine a threshold confidence based on one or more criteria. For example, the system may determine an accuracy metric for the first model and determine the first threshold confidence based on the accuracy metric. For example, if the system determines that the model used to determine the first prediction confidence is more accurate, the system may set a lower threshold confidence for selecting a state machine to generate a conversational query. In contrast, if the system determines that the model used to determine the first prediction confidence is less accurate, the system may set a higher threshold confidence for selecting a state machine to generate a conversational query.

Additionally or alternatively, the system may determine a frequency at which the user requires the first resolution and determine the first threshold confidence based on the frequency. For example, if the system determines that the user requires the first resolution more often, the system may set a lower threshold confidence for selecting a state machine to generate a conversational query. In contrast, if the system determines that the user requires the first resolution less often, the system may set a higher threshold confidence for selecting a state machine to generate a conversational query.

At step 508, process 500 (e.g., using one or more components described in system 400 (FIG. 4)) selects a state machine from a plurality of state machines. For example, the system may, in response to the first prediction confidence equaling or exceeding the first threshold confidence, select a first state machine from a plurality of state machines corresponding to a first resolution type of the first resolution.

In some embodiments, the system may select a state machine based on one or more criteria. For example, the system may determine a characteristic of the first resolution type and compare the characteristic with listings of respective state machines that correspond to each resolution type of the plurality of available resolutions to determine that the first state machine corresponds to the first resolution type. For example, a given state machine may be used for selecting a resolution for users with a particular characteristic (e.g., demographic, language preference, account status, etc.).

At step 510, process 500 (e.g., using one or more components described in system 400 (FIG. 4)) determines a first parameter. For example, the system may determine, using the first state machine, a first parameter for the first resolution. In some embodiments, the system may determine that a plurality of parameters are required. However, in order to conserve processing time and/or power, the system may determine whether or not the parameters are met based on a specific order. For example, the system may retrieve a plurality of parameters for the first resolution. The system may then determine a ranking for the plurality of parameters. The system may then select to determine the first parameter based on the ranking.

At step 512, process 500 (e.g., using one or more components described in system 400 (FIG. 4)) determines whether the first parameter is met. For example, the system may determine, based on the user data, whether the first parameter is met. To determine whether or not the first parameter is met, the system may retrieve data from one or more sources. In some embodiments, the system may access additional devices to generate this data. For example, the first parameter may comprise a required location of the user, wherein the user data comprises a current location of the user. For example, the user data may be collected from global-positioning data, such as location services information generated by a mobile device.

Additionally or alternatively, the first parameter may comprise available calendar dates for the first resolution, wherein the user data comprises a current date. For example, the user data may be collected from a calendar application. The system may compare event information in the calendar application to the first parameter. Additionally or alternatively, the first parameter may comprise a required electronic communication frequency, wherein the user data comprises a history of electronic communications of the user. For example, the system may pull information (e.g., from a user profile) to determine a frequency of communication.

At step 514, process 500 (e.g., using one or more components described in system 400 (FIG. 4)) generates a conversational query. For example, the system may, in response to the first parameter being met, generate for display, on a user interface (e.g., user interface 100 (FIG. 1)), a first dynamic conversational query corresponding to the first resolution. The system may likewise generate additional dynamic conversational queries. For example, the system may generate additional dynamic conversational queries in response to a user response (e.g., simultaneously), or the system may generate additional dynamic conversational queries in a series following a user response (e.g., one query after each response).

In some embodiments, each of these responses and/or queries may be generated based on a corresponding state machine. For example, the system may determine, based on the user data, a second prediction confidence that the user requires a second resolution of the plurality of available resolutions. The system may then compare the second prediction confidence to a second threshold confidence. The system may, in response to the second prediction confidence equaling or exceeding the second threshold confidence, select a second state machine from the plurality of state machines corresponding to a second resolution type of the second resolution. The system may determine, using the second state machine, a second parameter for the second resolution. The system may determine, based on the user data, whether the second parameter is met. The system may, in response to the second parameter not being met, generate for display, on the user interface, a second dynamic conversational query corresponding to meeting the second parameter.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the devices or equipment discussed in relation to FIGS. 1-4 could be used to perform one or more of the steps in FIG. 5.

The above-described embodiments of the present disclosure are presented for purposes of illustration, and not of limitation, and the present disclosure is limited only by the claims which follow. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method for generating dynamic conversational queries in user interfaces using state machine libraries, the method comprising: receiving user data; determining, based on the user data, a first prediction confidence that a user requires a first resolution of a plurality of available resolutions; comparing the first prediction confidence to a first threshold confidence; in response to the first prediction confidence equaling or exceeding the first threshold confidence, selecting a first state machine from a plurality of state machines corresponding to a first resolution type of the first resolution; determining, using the first state machine, a first parameter for the first resolution; determining, based on the user data, whether the first parameter is met; and in response to the first parameter being met, generating for display, on a user interface, a first dynamic conversational query corresponding to the first resolution.

2. The method of any one of the preceding embodiments, further comprising: determining, based on the user data, a second prediction confidence that the user requires a second resolution of the plurality of available resolutions; comparing the second prediction confidence to a second threshold confidence; in response to the second prediction confidence equaling or exceeding the second threshold confidence, selecting a second state machine from the plurality of state machines corresponding to a second resolution type of the second resolution; determining, using the second state machine, a second parameter for the second resolution; determining, based on the user data, whether the second parameter is met; and in response to the second parameter not being met, generating for display, on the user interface, a second dynamic conversational query corresponding to meeting the second parameter.

3. The method of any one of the preceding embodiments wherein determining, based on the user data, the first prediction confidence that the user requires the first resolution of the plurality of available resolutions further comprises: generating a feature input based on the user data; inputting the feature input into a first model; and receiving an output from the first model, wherein the output comprises the first prediction confidence.

4. The method of any one of the preceding embodiments, further comprising: determining an accuracy metric for the first model; and determining the first threshold confidence based on the accuracy metric.

5. The method of any one of the preceding embodiments, further comprising: determining a frequency at which the user requires the first resolution; and determining the first threshold confidence based on the frequency.

6. The method of any one of the preceding embodiments, wherein selecting the first state machine from the plurality of state machines corresponding to the first resolution type of the first resolution comprising: determining a characteristic of the first resolution type; and comparing the characteristic with listings of respective state machines that correspond to each resolution type of the plurality of available resolutions to determine that the first state machine corresponds to the first resolution type.

7. The method of any one of the preceding embodiments, further comprising: retrieving a plurality of parameters for the first resolution; determining a ranking for the plurality of parameters; and selecting to determine the first parameter based on the ranking.

8. The method of any one of the preceding embodiments, wherein the first parameter comprises a required location of the user, and wherein the user data comprises a current location of the user.

9. The method of any one of the preceding embodiments, wherein the first parameter comprises available calendar dates for the first resolution, and wherein the user data comprises a current date.

10. The method of any one of the preceding embodiments, wherein the first parameter comprises a required electronic communication frequency, and wherein the user data comprises a history of electronic communications of the user.

11. A tangible, non-transitory, machine-readable medium storing instructions that, when executed by a data processing apparatus, cause the data processing apparatus to perform operations comprising those of any of embodiments 1-10.

12. A system comprising: one or more processors; and memory storing instructions that, when executed by the processors, cause the processors to effectuate operations comprising those of any of embodiments 1-10.

13. A system comprising means for performing any of embodiments 1-10.

What is claimed is:

1. A system for generating dynamic conversational queries in user interfaces using state machine libraries, the system comprising:
   cloud-based storage circuitry configured to store a first model for determining, based on user data, a first prediction confidence that a user requires a first resolution of a plurality of available resolutions, wherein the user data comprises a history of electronic communications of the user;
   cloud-based control circuitry configured to:
   receive the user data in response to the user interacting with a user interface;
   generate a feature input based on the user data;
   input the feature input into the first model;
   receive an output from the first model, wherein the output comprises the first prediction confidence;
   compare the first prediction confidence to a first threshold confidence;
   in response to the first prediction confidence equaling or exceeding the first threshold confidence, select a first state machine from a plurality of state machines corresponding to a first resolution type of the first resolution;
   determine, using the first state machine, a first parameter for the first resolution, wherein the first parameter comprises a required electronic communication frequency;
   determine, based on the user data, whether the first parameter is met based on comparing the required electronic communication frequency to the history of electronic communications; and
   cloud-based input/output circuitry configured to generate for display, on a user interface, a first dynamic conversational query corresponding to the first resolution in response to the first parameter being met, wherein the first dynamic conversational query comprises dialog related to the first resolution.

2. A method for generating dynamic conversational queries in user interfaces using state machine libraries, the method comprising:
   receiving user data;
   determining, based on the user data, a first prediction confidence that a user requires a first resolution of a plurality of available resolutions;
   comparing the first prediction confidence to a first threshold confidence;
   in response to the first prediction confidence equaling or exceeding the first threshold confidence, selecting a first state machine from a plurality of state machines corresponding to a first resolution type of the first resolution;
   determining, using the first state machine, a first parameter for the first resolution;
   determining, based on the user data, whether the first parameter is met; and
   in response to the first parameter being met, generating for display, on a user interface, a first dynamic conversational query corresponding to the first resolution.

3. The method of claim 2, further comprising:
- determining, based on the user data, a second prediction confidence that the user requires a second resolution of the plurality of available resolutions;
- comparing the second prediction confidence to a second threshold confidence;
- in response to the second prediction confidence equaling or exceeding the second threshold confidence, selecting a second state machine from the plurality of state machines corresponding to a second resolution type of the second resolution;
- determining, using the second state machine, a second parameter for the second resolution;
- determining, based on the user data, whether the second parameter is met; and
- in response to the second parameter not being met, generating for display, on the user interface, a second dynamic conversational query corresponding to meeting the second parameter.

4. The method of claim 2, wherein determining, based on the user data, the first prediction confidence that the user requires for the first resolution of the plurality of available resolutions further comprises:
- generating a feature input based on the user data;
- inputting the feature input into a first model; and
- receiving an output from the first model, wherein the output comprises the first prediction confidence.

5. The method of claim 4, further comprising:
- determining an accuracy metric for the first model; and
- determining the first threshold confidence based on the accuracy metric.

6. The method of claim 4, further comprising:
- determining a frequency at which the user requires the first resolution; and
- determining the first threshold confidence based on the frequency.

7. The method of claim 2, wherein selecting the first state machine from the plurality of state machines corresponding to the first resolution type of the first resolution comprising:
- determining a characteristic of the first resolution type; and
- comparing the characteristic with listings of respective state machines that correspond to each resolution type of the plurality of available resolutions to determine that the first state machine corresponds to the first resolution type.

8. The method of claim 2, further comprising:
- retrieving a plurality of parameters for the first resolution;
- determining a ranking for the plurality of parameters; and
- selecting to determine the first parameter based on the ranking.

9. The method of claim 2, wherein the first parameter comprises a required location of the user, and wherein the user data comprises a current location of the user.

10. The method of claim 2, wherein the first parameter comprises available calendar dates for the first resolution, and wherein the user data comprises a current date.

11. The method of claim 2, wherein the first parameter comprises a required electronic communication frequency, and wherein the user data comprises a history of electronic communications of the user.

12. A non-transitory, computer readable medium for generating dynamic conversational queries in user interfaces using state machine libraries comprising instructions that when executed by one or more processors, cause operations comprising:
- receiving user data;
- determining, based on the user data, a first prediction confidence that a user requires a first resolution of a plurality of available resolutions;
- comparing the first prediction confidence to a first threshold confidence;
- in response to the first prediction confidence equaling or exceeding the first threshold confidence, selecting a first state machine from a plurality of state machines corresponding to a first resolution type of the first resolution;
- determining, using the first state machine, a first parameter for the first resolution;
- determining, based on the user data, whether the first parameter is met; and
- in response to the first parameter being met, generating for display, on a user interface, a first dynamic conversational query corresponding to the first resolution.

13. The non-transitory, computer readable medium of claim 12, further comprising:
- determining, based on the user data, a second prediction confidence that the user requires a second resolution of the plurality of available resolutions;
- comparing the second prediction confidence to a second threshold confidence;
- in response to the second prediction confidence equaling or exceeding the second threshold confidence, selecting a second state machine from the plurality of state machines corresponding to a second resolution type of the second resolution;
- determining, using the second state machine, a second parameter for the second resolution;
- determining, based on the user data, whether the second parameter is met; and
- in response to the second parameter not being met, generating for display, on the user interface, a second dynamic conversational query corresponding to meeting the second parameter.

14. The non-transitory, computer readable medium of claim 12, wherein determining, based on the user data, the first prediction confidence that the user requires the first resolution of the plurality of available resolutions further comprises:
- generating a feature input based on the user data;
- inputting the feature input into a first model; and
- receiving an output from the first model, wherein the output comprises the first prediction confidence.

15. The non-transitory, computer readable medium of claim 14, further comprising:
- determining an accuracy metric for the first model; and
- determining the first threshold confidence based on the accuracy metric.

16. The non-transitory, computer readable medium of claim 14, further comprising:
- determining a frequency at which the user requires the first resolution; and
- determining the first threshold confidence based on the frequency.

17. The non-transitory, computer readable medium of claim 12, wherein selecting the first state machine from the plurality of state machines corresponding to the first resolution type of the first resolution comprising:
- determining a characteristic of the first resolution type; and
- comparing the characteristic with listings of respective state machines that correspond to each resolution type of the plurality of available resolutions to determine that the first state machine corresponds to the first resolution type.

18. The non-transitory, computer readable medium of claim 12, further comprising:
retrieving a plurality of parameters for the first resolution;
determining a ranking for the plurality of parameters; and
selecting to determine the first parameter based on the ranking.

19. The non-transitory, computer readable medium of claim 12, wherein the first parameter comprises a required location of the user, and wherein the user data comprises a current location of the user.

20. The non-transitory, computer readable medium of claim 12, wherein the first parameter comprises available calendar dates for the first resolution, and wherein the user data comprises a current date.

* * * * *